United States Patent Office 2,864,579
Patented Dec. 16, 1958

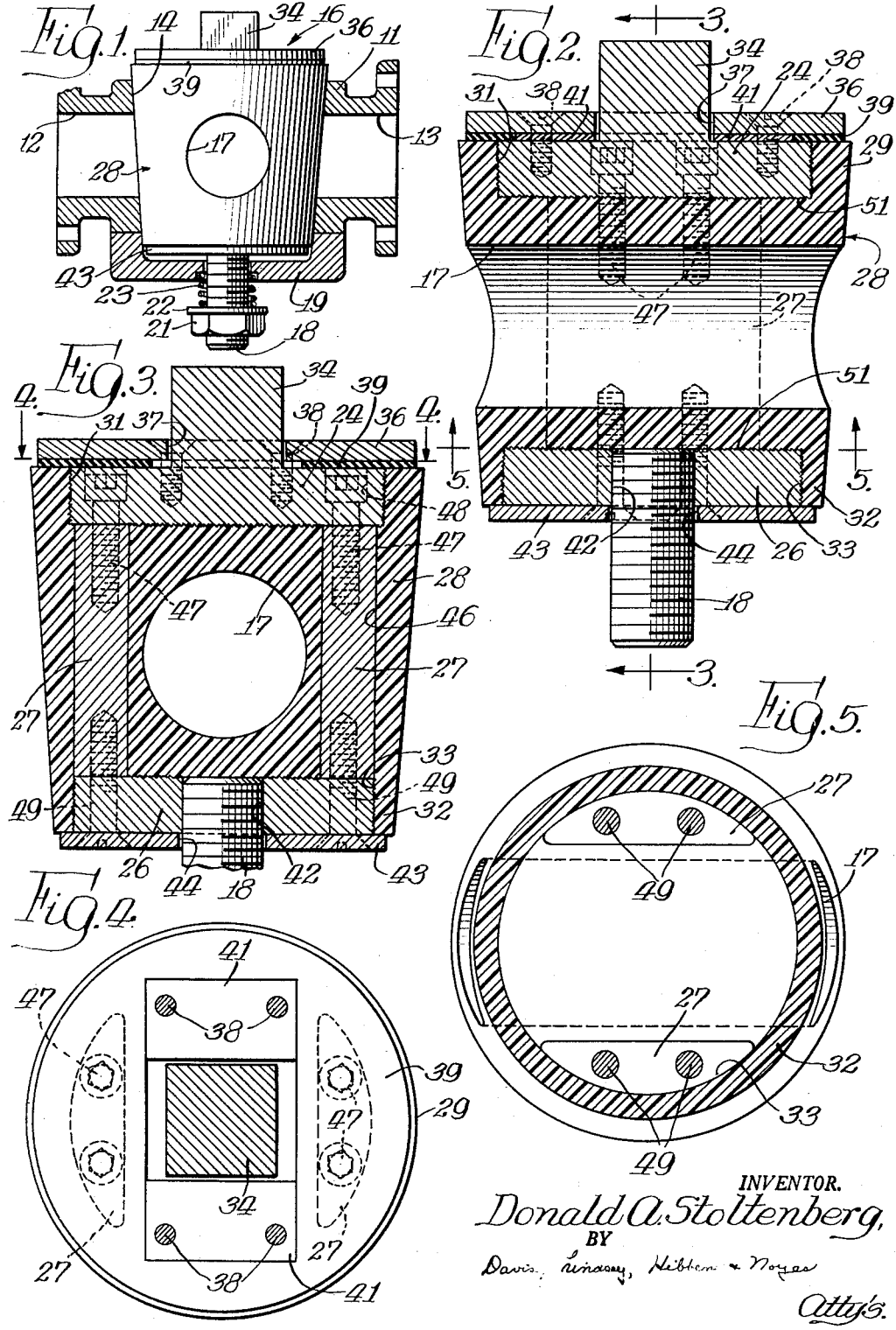

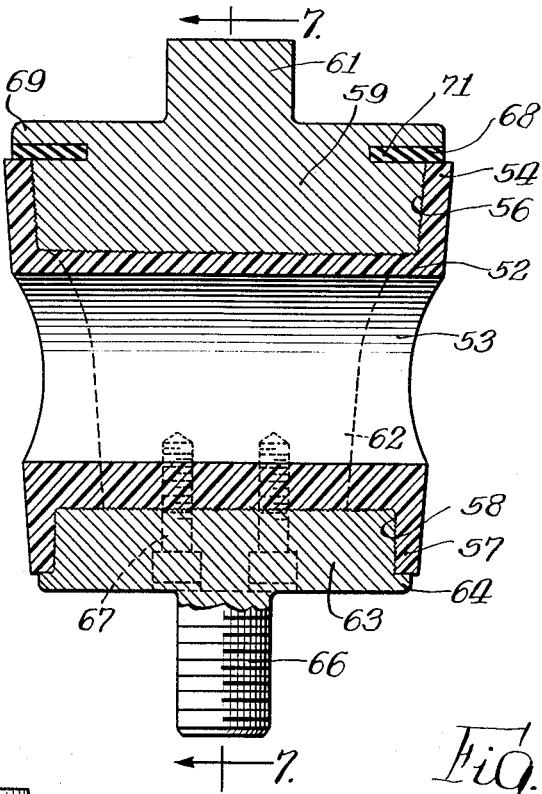
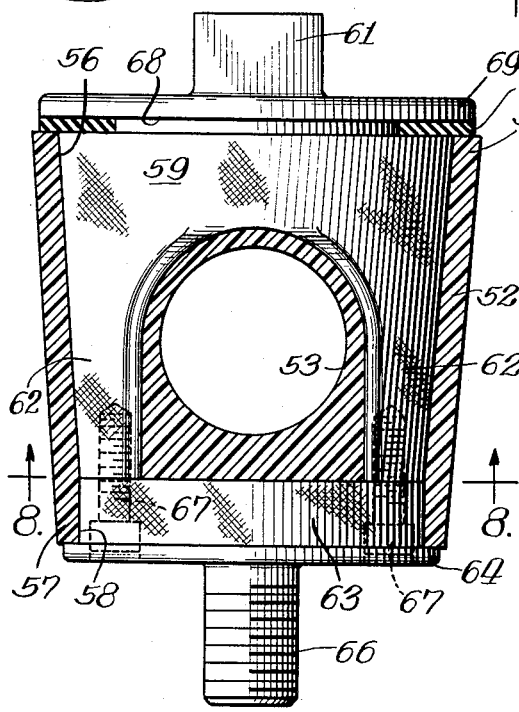
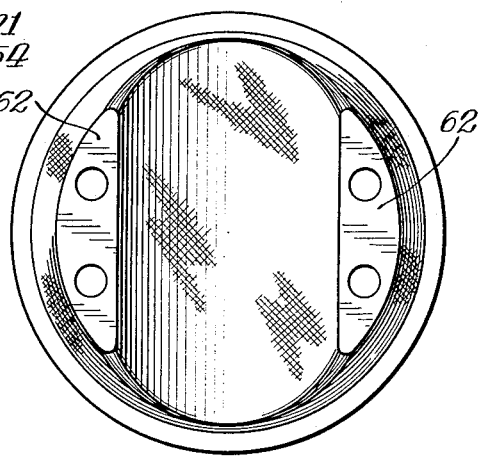

2,864,579
NON-STICKING PLUG VALVE
Donald A. Stoltenberg, Chicago, Ill.

Application November 18, 1953, Serial No. 392,917

12 Claims. (Cl. 251—309)

This invention relates to rotary plug valves and more particularly to an improved non-sticking valve of this type.

As is well known, plug valves are notorious for their tendency to stick or "freeze" in one position. Consequently they are sometimes subject to galling and they usually require frequent maintenance service to insure their proper operation. Various attempts have been made to overcome the sticking tendency of plug valves by resorting to special lubricating arrangements which are both complex and expensive. The use of special materials of construction has also been proposed to avoid sticking.

For example, in one scheme a special sleeve or liner is interposed between the valve seat and the valve plug to avoid metal-to-metal contact, the sleeve being made from a synthetic plastic or resin having non-sticking characteristics. However, this expedient introduces a detachable extra element or part into the valve construction which complicates maintenance. Furthermore, fluid tends to enter and accumulate between the sleeve and the valve body which is highly objectionable for certain uses of plug valves, particularly in the sanitary valve field such as in the beer, dairy, beverage and allied industries.

Accordingly, it is a primary object of my invention to provide novel means for preventing sticking in a rotary plug valve.

A further object of the invention is to provide a novel plug valve which is not subject to sticking but which does not embody special lubrication schemes and extra detachable parts.

Another object of the invention is to provide a novel non-sticking plug valve construction which is particularly adapted for use as a sanitary valve.

An additional object of the invention is to provide a novel means for utilizing non-sticking plastic or resinous materials in plug valves.

Still another object of the invention is to provide, in a rotary plug valve, a novel non-sticking rotary plug portion.

Other objects and advantages of the invention will become evident from the subsequent detailed description taken in conjunction with the accompanying drawings, wherein:

Fig. 1 is a sectional view, partially in elevation, of an assembled plug valve constituting one specific embodiment of my invention;

Fig. 2 is a cross sectional view on an enlarged scale of the plug portion of the valve shown in Fig. 1;

Fig. 3 is a sectional view taken along the line 3—3 of Fig. 2;

Fig. 4 is a transverse sectional view looking downwardly along the line 4—4 of Fig. 3;

Fig. 5 is a transverse sectional view looking upwardly along the line 5—5 of Fig. 2;

Fig. 6 is a sectional view of the plug portion of a valve comprising a different embodiment of the invention;

Fig. 7 is a sectional view taken along the line 7—7 of Fig. 6; and

Fig. 8 is a view looking upwardly along the line 8—8 of Fig. 7 but with the outer portion of the plug removed.

Referring first to Figs. 1 to 5, wherein one specific structural embodiment of the invention is shown by way of illustration, the valve comprises a casing or body 11 having the usual pair of oppositely disposed fluid passageways 12 and 13 (Fig. 1) and also having a transversely extending tapered bore or passageway 14 which constitutes the valve seat. A tapered valve plug, indicated generally at 16 in Fig. 1 and hereinafter described in detail, is rotatably disposed in contact with the tapered seat 14 of the valve body 11 and is provided with a transverse bore or passage 17 which is adapted to be aligned with the passages 12 and 13 in the valve body by rotation of the plug 90° from the position shown in Fig. 1. A threaded stem 18 depends from the bottom of the valve plug 16 through an apertured bridge 19 which spans the bottom of the valve plug 16 and is rigid with the valve body 11. An adjusting nut 21 and a thrust washer 22 are carried on the stem 18, and a spring member 23 coacts between the bridge 19 and the thrust washer 22 for retaining the valve plug 16 in seated relation within the valve body 11 under predetermined spring pressure. The means just described for retaining the valve plug 16 in the valve body 11 does not constitute any part of my present invention, and it will be understood that any other suitable means may be employed for this purpose.

As heretofore mentioned, the conventional plug valve having a metal body and a metal plug portion is notorious for its tendency to stick at the metal-to-metal contact points between the body and the rotatable plug. My invention overcomes this tendency toward sticking by utilizing in the valve plug portion a non-sticking self-lubricating plastic or resinous material so as to completely eliminate all metal-to-metal contact between the operating portions of the valve structure. Such plastic or resinous materials do not usually have sufficient structural strength and other required structural properties to permit their use as the sole structural material for a valve plug. Consequently, an important feature of my invention resides in the manner of combining metal parts with the plastic or resinous material to provide a valve plug having the desired characteristics.

Thus, as seen in Figs. 2 to 5, the valve plug 16 consists essentially of an upper end member or metal portion 24, a lower end member or metal portion 26, a pair of interconnecting metal core portions 27, and a one-piece enclosure or sheath of non-sticking resinous material, indicated generally at 28. In other words, the main body of the valve plug 16 is formed from an integral one-piece resinous member 28 having the metal members 24, 26 and 27 secured therein and substantially completely surrounded and enclosed by the plastic or resinous material. By this arrangement it will be seen that only the resinous body portion 28 of the valve plug 16 is in contact with the metal valve seat 14 of the valve body 11 at any time. The valve plug bore 17 extends centrally through the resinous body portion 28 so that the fluid passing through the valve when in open position comes in contact only with the plastic or resinous portion of the valve plug.

The resinous body portion 28 of the valve plug 16 has an integral upper skirt portion 29 defining a circular end recess 31 and also an integral lower skirt portion 32 defining a bottom circular recess 33. The upper metal member 24 is in the form of a disk or circular flange received within the recess 31 and having an upright integral shank or square shoulder portion 34 which is adapted to be manipulated by a wrench or other tool for turning the valve plug. A retaining disk 36 having a central aperture 37 through which the shank 34 extends is secured to the member 24 by means of a plurality of screws 38, the disk 36 being of somewhat greater diameter than the member 24 so as to overlie to some extent the upper axial end of the skirt portion 29. An expansion ring or gasket 39 of rubber or like resilient material is interposed between the retaining disk 36 and the underlying end of the skirt portion 29 of the resinuous body 28. A pair of shims or spacer elements 41 are also disposed between the disk 36 and the member 24 for maintaining the latter in spaced relation for receiving the expansion ring 39.

The bottom metal end member 26 comprises a circular metal element which is received within the recess 33 of the lower skirt portion 32, and the threaded stem 18 has a threaded connection, as at 42, in the member 26. An annular retaining disk 43 having a central opening 44 for the stem 18 is mounted against the member 26 and is of sufficient diameter to overlie the lower axial end of the skirt portion 32.

For rigidly interconnecting the upper and lower metal end members 24 and 26, I provide the pair of elongated metal core pieces 27 having a substantially segmental cross-sectional configuration, as clearly seen in Fig. 4. The core pieces 27 are received within a pair of similarly shaped openings 46 extending through the resinous body 28 on opposite sides of the transversely extending fluid passageway 17. A pair of screws 47 extend through the upper end member 24 into each of the upper ends of the core pieces 27, the heads of the screws in this instance being recessed, as at 48, within the member 24. At the lower end of the valve plug, a pair of screws 49 extend through the retaining disk 43 and the bottom metal member 26 into each of the lower ends of the core pieces 27. Consequently, it will readily be seen that the members 24, 26, and 27 are rigidly connected together by means of the screws 47 and 49 to provide a rigid metal skeleton or framework for the valve plug which is substantially completely surrounded by the plastic or resinous material 28. The interposition of the connectors or core pieces 27 between the end members 24 and 26 serves to hold the latter a substantially fixed distance apart so as to avoid distortion of the body 28 when the screws 47 and 49 are tightened. Also, it will be readily understood that because of the segmental cross sectional configuration of the core pieces 27, there is a concentric relationship between the outer curved peripheries of the core pieces 27 and the surrounding plastic or resinous material 28. Thus, as seen in Fig. 4, at any given cross-section through the valve plug the radial thickness of plastic or resinous material between the core pieces 27 and the outer periphery of the valve plug is substantially uniform thereby contributing materially to the structural strength of the valve plug and avoiding areas of structural weakness due to non-uniform thicknesses of the plastic or resinous material.

The body portion 28 of the valve plug may be made of any suitable plastic or resinous material having a low coefficient of friction with metal and characterized by slippery self-lubricating properties so as to be substantially non-sticking when in contact with metal. Such materials may conveniently be referred to as lubric materials. The tetrafluoroethylene polymers are particularly suitable for use in my invention and are perhaps best exemplified by the product known commercially by the trade-mark "Teflon" and manufactured by E. I. du Pont de Nemours & Co. This material has substantial chemical inertness and excellent resistance to a wide variety of materials. It has an extremely low coefficient of friction with metal so that when in close sealing engagement with a metal surface, as in the plug valve construction described above, it does not resist relative movement therebetween. Although "Teflon" is presently the preferred resinous material having the desired self-lubricating non-sticking qualities for purposes of my invention, other lubric materials may also be used for this purpose. For example, the polymer of trifluorochloroethylene which is manufactured and sold by the M. W. Kellogg Company under the trade-mark "Kel-F" may also be used. In addition, the solid polymers of ethylene may likewise be used in certain circumstances. Also, the long-chain polymeric amides such as nylon will also find application in certain instances in accordance with the principles of my invention.

Because of the extremely low coefficient of friction between these various resinous materials and metal, I preferably take special precautions to prevent relative movement between the resinous body 28 and the upper and lower metal members 24 and 26. To this end, the entire external surface area of the metal members 24 and 26 which is in contact with the resinous body 28 is knurled or otherwise roughened in order to increase the frictional contact area at these points and to provide a more intimate gripping engagement between the metal and resinous elements of the valve plug. Thus, in Figs. 2 and 3 the exterior surface of the metal members 24 and 26 is shown with continuous uninterrupted knurling, as at 51. Preferably, the total knurled contact area of the metal members 24 and 26 with the resinous material 28 is substantially in excess of the contact area between the exterior of the resinous material 28 and the metal valve seat 14. Thus, by reason of this increased frictional contact and also by the axial clamping pressure between the end members 24 and 26 as interconnected through the core pieces 27 and the screws 47 and 49, the component parts of the valve plug 16 are rigidly retained together in assembled relationship such that the valve plug can be manipulated as a unit.

During certain usages of the plug valve in which the valve is subjected to elevated operating temperatures, the expansion ring or gasket 39 permits a certain degree of expansion of the resinous body 28. In particular, the expansion ring 39 accommodates endwise or axial expansion of the valve portion 28. The lower end of the skirt portion 32 is substantially confined by the retaining disk 43 but the upper skirt portion 29 is free to undergo limited endwise expansion by reason of the rubber ring 39 which is interposed between the skirt 29 and the upper retaining plate 36. Thus, the valve is designed to be used at elevated operating temperatures without disturbing the structural relationship of the various parts of the valve plug and even though the metal and resinous parts may have different coefficients of expansion.

Although the invention is illustrated herein in connection with a two-way plug valve, it will be apparent that the same principle of construction can also be adapted to a three-way valve wherein the resinous body portion of the valve plug would be provided with a three-way fluid passage adapted to be aligned with similar openings in the valve body.

In Figs. 6 to 8 I have shown a somewhat different embodiment of the invention which, however, incorporates the same general principles as in the first described embodiment. In effect, in this modification of the invention the upper metal member 24 and the elongated core pieces 27 illustrated in Figs. 2 to 5 are combined into an integral one-piece metal member.

Thus, the body portion of the valve plug is formed of a one-piece integral mass of plastic or resinous material 52 having a fluid passageway 53 therethrough, the plastic or resinous material being of the same non-sticking self-lubricating character heretofore described. The resinous body 52 has an upper skirt portion 54 defining an upper end recess 56 and a lower skirt portion 57 defining a lower end recess 58. A tapered metal core member is provided having an upper circular head portion 59 which is received within the recess 56 and which carries an integral square extension or operating portion 61. Depending integrally from the upper head portion 59 and extending axially on opposite sides of the bore 53 through the resinous body 52 are metal leg members 62 which have a generally segmental cross-sectional shape. This cross-sectional shape of the leg portions 62 will readily be seen from Fig. 8 which is a view from the lower end of the metal core member with the plastic body 52 removed. It will also be understood that the metal legs 62 merge smoothly at their upper ends into the circular head portion 59, as hereinbefore described, so as to provide a generally U-shaped one-piece metal core. In this instance because of the axially tapered shape of the metal core member, it will be seen that the radial thickness of resinous material surrounding the metal core is uniform not only in any given transverse section but also from one end to the other of the valve plug.

A bottom member or cap 63 of metal is received within the recess 58 and has an integral flange or lip 64 overlying the skirt 57 as well as a depending threaded stem 66. The bottom member or cap 63 is rigidly attached to the U-shaped metal core by means of a pair of screws 67 which extend through the cap 63 into each of the leg portions 62.

The upper head portion 59 of the U-shaped metal core has a radial recess 68 and a flange portion 69 which overlies to some extent the upper end of the skirt portion 54. An expansion ring 71 of rubber or the like is disposed within the recess 68 to accommodate endwise expansion of the resinous body 52 in the same general manner as hereinbefore described in connection with Figs. 2 to 5.

From the foregoing, it will be seen that my invention provides a novel means of utilizing the self-lubricating non-sticking plastic or resinous materials in the construction of the plug portion of a rotary plug valve. Consequently, the invention provides a novel non-sticking plug valve which does not necessitate the use of detachable plastic sleeves or the like to prevent metal-to-metal contact between the operating portions of the valve. Thus, the invention finds particular utility in the sanitary valve field where there is a demand for a non-sticking plug valve with a minimum number of detachable parts which can be readily cleaned.

Although the invention has been described with particular reference to certain specific structural embodiments thereof, it will be understood that various modifications and equivalent structures may be resorted to without departing from the scope of the invention as defined in the appended claims.

I claim:

1. In a plug valve having a valve body including a valve seat, a rotatable valve plug comprising a body portion in rotary sealing engagement with said seat and formed from a lubric material having a low coefficient of friction with said seat, a pair of metal end portions disposed in axial recesses at the opposite axial ends of said body portion, elongated connecting means extending through said body portion and between said end portions in substantially rigid relation therewith for holding the end portions a substantially fixed distance apart, and fastening elements coacting with at least one of said end portions for retaining the valve plug in unitary assembled relation.

2. The structure of claim 1 further characterized in that said lubric material comprises a tetrafluoroethylene polymer.

3. The structure of claim 1 further characterized in that the surfaces of said metal end portions which are in contact with said body portion are roughened in order to provide an increased frictional gripping area.

4. In a plug valve having a valve body with inlet and outlet fluid passages and a metal valve seat, a rotatable valve plug comprising an elongated tapered body portion disposed in rotary sealing engagement with said seat and formed from a resinous material having a low coefficient of friction with said seat whereby to provide non-sticking self-lubricating operation of the valve plug, said body portion having a transverse fluid passage therethrough adapted to be moved into and out of alignment with the inlet and outlet fluid passages in said valve body, a pair of metal end portions at the opposite ends of said body portion, and elongated connecting means extending axially through said body portion and rigidly interconnecting said end portions, said tapered body portion having a circular transverse cross-sectional shape and said connecting means having a substantially segmental cross-sectional shape and disposed in substantially concentric relation with the outer periphery of said body portion at any transverse section therethrough.

5. The structure of claim 4 further characterized by the provision of separate fastening means coacting with at least one of said end portions for retaining the same in assembled relation with said connecting means.

6. In a plug valve having a valve body with inlet and outlet fluid passages and a metal valve seat, a rotatable valve plug comprising an elongated tapered body portion disposed in rotary sealing engagement with said seat and formed from a resinous material having a low coefficient of friction with said seat whereby to provide non-sticking self-lubricating operation of the valve plug, said body portion having a transverse fluid passage therethrough adapted to be moved into and out of alignment with the inlet and outlet fluid passages in said valve body, a pair of detachable metal end portions at the opposite axial ends of said body portion, and a plurality of elongated connecting members extending axially through said body portion and secured to said end portions for rigidly interconnecting the latter, said tapered body portion having a circular transverse cross-sectional shape and said connecting members having a substantially segmental cross-sectional shape with the curved surfaces thereof being disposed in substantially concentric relation with the outer periphery of said body portion at any transverse section therethrough.

7. In a plug valve having a valve body including a valve seat, a rotatable valve plug comprising a body portion in rotary sealing engagement with said seal and formed from a lubric material having a low coefficient of friction with said seat, generally U-shaped metal core means having an end portion mounted at one end of said body portion and having a pair of spaced leg portions extending integrally from said end portion through said body portion to the opposite end thereof, and a detachable end member mounted at the opposite end of said body portion and secured to the ends of said leg portions for retaining the valve plug in unitary assembled relation.

8. In a plug valve having a valve body with inlet and outlet fluid passages and a metal valve seat, a rotatable valve plug comprising an elongated tapered body portion disposed in rotary sealing engagement with said seat and formed from a resinous material having a low coefficient of friction with said seat whereby to provide non-sticking self-lubricating operation of the valve plug, said body portion having a transverse fluid passage therethrough adapted to be moved into and out of alignment with the inlet and outlet fluid passages in said valve body, a generally U-shaped axially tapered metal core member having an end portion mounted at one end of said body portion and having a pair of spaced leg portions extending integrally from said end portion through said body portion to the opposite end thereof, and a detachable end member mounted at the opposite end of said body portion and secured to the ends of said leg portions for retaining the valve plug in unitary assembled relation, said end portion being circular in cross-section and said leg portions merging smoothly with said end portion and having a substantially segmental cross-sectional shape with the curved surfaces thereof being disposed in substantially concentric relation with the outer periphery of said body portion at any transverse section therethrough.

9. In a plug valve having a valve body including a valve seat, a rotatable valve plug comprising a body portion in rotary sealing engagement with said seat and formed from a lubric material having a low coefficient of friction with said seat, a pair of end retaining means of metal and disposed in axial recesses at the opposite axial ends of said body portion whereby said end retaining means are out of contact with said seat and whereby said seat is engaged solely by said body portion, said end retaining means having portions overlying to a substantial extent the opposite axial ends of said body portion, means extending through said body portion and rigidly interconnecting said end retaining means, and a resilient member interposed between one of said retaining means and the adjacent axial end of said body portion for accommodating axial expansion of said body portion.

10. In a plug valve having a valve body with a metal valve seat, a rotatable valve plug comprising a body portion in rotary engagement with said seat and formed from a resinous material having a low coefficient of friction with said seat, and a metal core structure surrounded by said body portion so that said seat is contacted solely by said body portion whereby to provide non-sticking operation, said core structure including end portions engaging said body portion adjacent the opposite axial ends thereof, elongated spacer portions interposed axially between said end portions in rigid non-adjustable engagement with the inner faces of the latter for holding the end portions a fixed distance apart, and means connecting said end portions to the opposite ends of said spacer portions, the rigid coaction between said spacer portions and said end portions preventing distortion of said body portion during assembly of the plug.

11. The structure of claim 10 further characterized in that said end portions are disposed in axial recesses in the opposite axial ends of said body portion.

12. The structure of claim 10 further characterized in that said resinous material comprises a tetrafluoroethylene polymer.

References Cited in the file of this patent

UNITED STATES PATENTS

| | | |
|---|---|---|
| 671,678 | Krebs | Apr. 9, 1901 |
| 2,571,925 | Mueller | Oct. 16, 1951 |
| 2,629,580 | Schultis | Feb. 24, 1953 |

FOREIGN PATENTS

| | | |
|---|---|---|
| 112,333 | Sweden | of 1943 |

OTHER REFERENCES

"The Chemical Age," vol. 6, Jan. 1, 1949, pp. 10–14, published by Benn Brothers Ltd., 154 Fleet St., London.

"Modern Plastics," vol. 26, October 1948, pages 168, 170, 172, published by Modern Plastics, Inc., 122 E. 42nd St., New York 17, N. Y.